Figure 1:
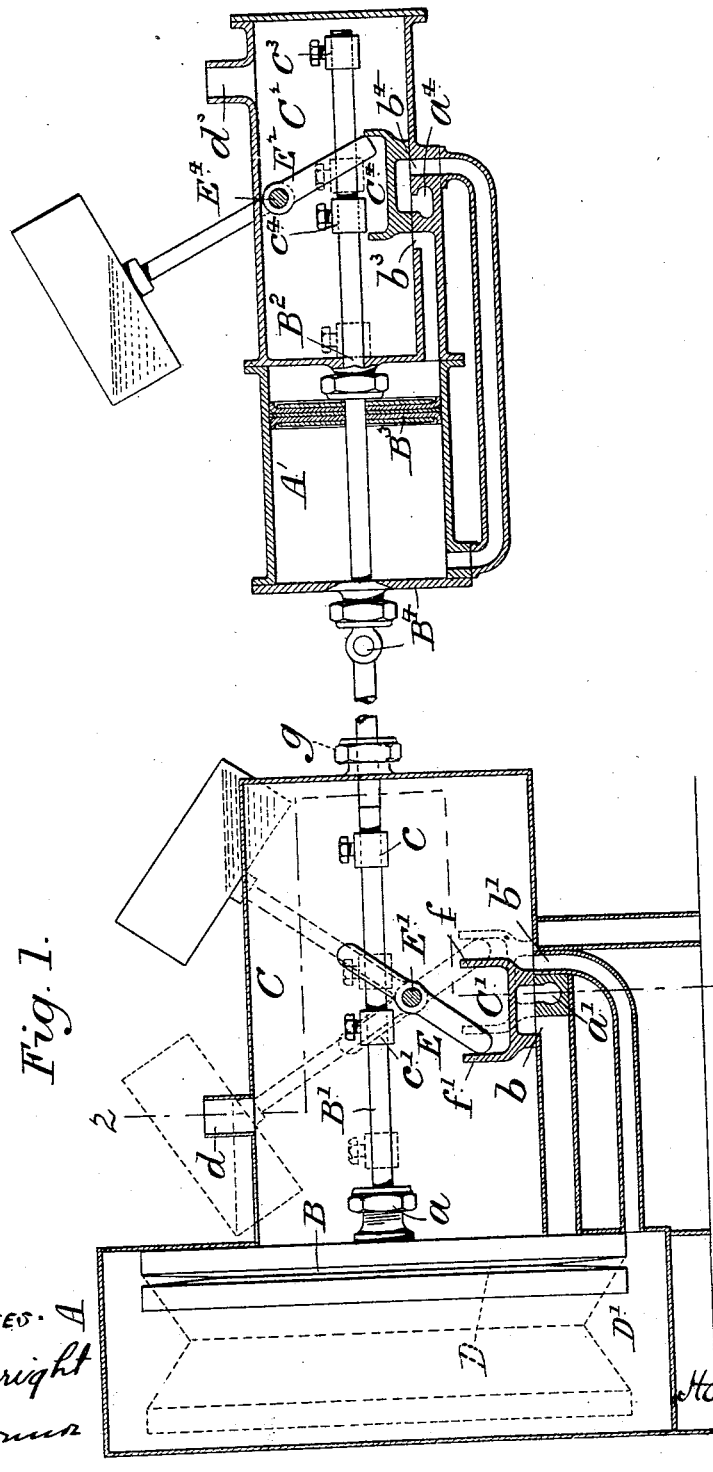

No. 684,323. Patented Oct. 8, 1901.
E. TATHAM.
APPARATUS FOR MEASURING FLUIDS.
(Application filed Feb. 13, 1901.)
(No Model.) 2 Sheets—Sheet 1.

WITNESSES:
F. W. Wright
S. C. Conner

INVENTOR
EDWIN TATHAM
BY
Howson & Howson
HIS ATTORNEYS

No. 684,323. Patented Oct. 8, 1901.
E. TATHAM.
APPARATUS FOR MEASURING FLUIDS.
(Application filed Feb. 13, 1901.)
(No Model.) 2 Sheets—Sheet 2.
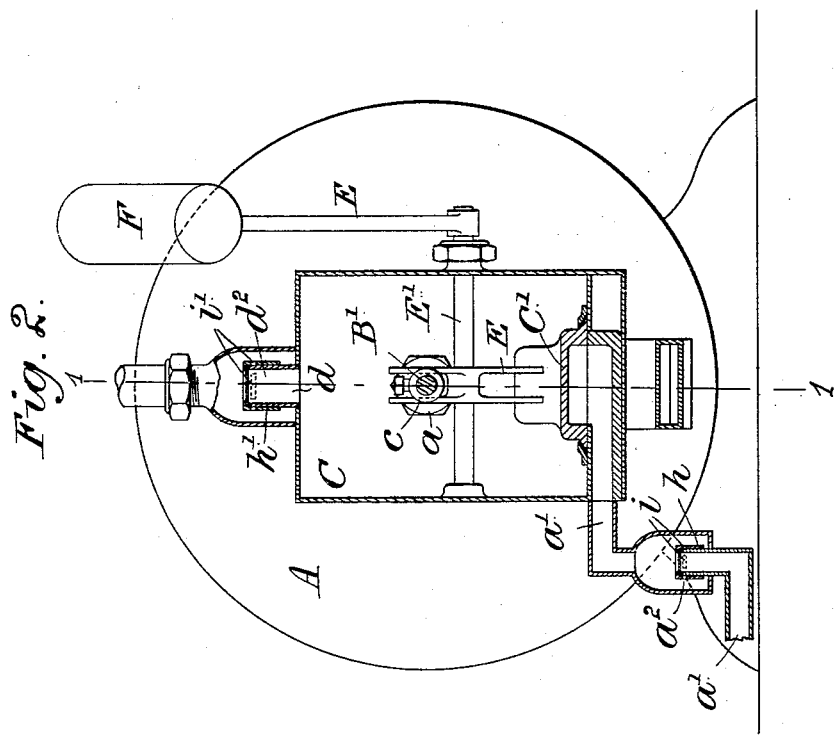

UNITED STATES PATENT OFFICE.

EDWIN TATHAM, OF LEWISHAM, ENGLAND.

APPARATUS FOR MEASURING FLUIDS.

SPECIFICATION forming part of Letters Patent No. 684,323, dated October 8, 1901.

Application filed February 13, 1901. Serial No. 47,144. (No model.)

*To all whom it may concern:*

Be it known that I, EDWIN TATHAM, gas-engineer, a subject of the King of Great Britain and Ireland, residing at Colfe Lodge, Lewisham Hill, Lewisham, in the county of Kent, England, have invented certain new and useful Improvements in Apparatus for Measuring Gas, Water, or other Fluids, applicable also as a motor or as a pump; and I do hereby declare the following to be a full, clear, and exact description of the invention, such as will enable others skilled in the art to which it appertains to make and use the same.

My invention has for its object to provide an apparatus by which gas can be measured with great accuracy and compressed before being conducted to the place of consumption, the said apparatus being simple and economical in construction and not liable to readily get out of order.

Figure 1 of the accompanying drawings is a vertical section on the line 1 1, Fig. 2, of an apparatus constructed according to my invention for measuring and compressing gas; and Fig. 2 is a transverse section of the gas-meter on the line 2 2, Fig. 1.

A is a casing or gas-measuring chamber containing a bellows B, to which is connected a rod B', passing through a stuffing-box $a$ into a box or chamber C, situated outside the measuring-chamber and containing a valve C', which controls an inlet-passage $a'$ and ports $b\ b'$, communicating, respectively, with the interior D of the bellows and with the space D' outside the bellows. The valve C' is operated by a lever E, secured to a shaft E', capable of oscillating in the box or chamber C, which lever is acted on by pins or projections $c\ c'$ on the rod B', which pins or projections come into contact with the said lever E before the termination of each stroke or impulse of the bellows B, so as to turn the said lever slightly beyond a vertical position, which lever is then by a rolling weight or a body of mercury or other liquid contained in a tube or chamber F (carried on the upper end of the lever $E^2$, secured to the shaft E') caused to tilt suddenly and act upon the valve C' with a quick movement to reverse its position. The gas to be measured enters the valve box or chamber C by the inlet $a'$, and if the valve be in the position shown by full lines in Fig. 1 the said gas passes through the port or passage $b$ to the interior of the bellows and expands the said bellows. As the bellows expands the pin or projection $c$ on the rod B acts upon the lever E, so as to turn it, and before the bellows completes its expansion the said lever E is turned beyond its vertical position, whereupon the weight or the liquid in the tube or chamber F will cause the lever E to suddenly tilt or fall over and so turn the shaft E' as to cause the lower end of the lever E, by striking the projection $f$ on the valve C', to rapidly reverse the position of the valve from the position shown by full lines into that shown by dotted lines, thereby opening the communication between the inlet $a'$ and the port $b'$. The gas will then pass through the port $b'$ to the space D' outside the bellows, causing the said bellows to collapse and force the gas from the interior thereof through the port $b$ into the valve-box C and out therefrom by the passage $d$ to the place of consumption. As the bellows is collapsing the pin or projection $c'$ on the rod B' bears on the lever E and turns it. Before the termination of this movement of the bellows the weight or the liquid in the tube or chamber F will move to the opposite end of the said tube or chamber and cause the lever E to suddenly fall over and turn the shaft E', so as to cause the lower end of the lever E to strike the projection $f'$ on the valve C', and so quickly reverse the position of the said valve C'. This valve is thus moved into the position it previously occupied, thereby opening the port $b$ for the passage of the gas to the interior of the bellows, as before, to expand the bellows, and thereby force the gas from the space D' outside the bellows into the valve box or casing C and out through the outlet $d$. It will thus be seen that at each pulsation of the bellows a known quantity of fluid is passed through the apparatus, and each discharge can be accurately registered or indicated on a scale or counter actuated by the tilting lever E or by any other suitable moving part of the apparatus.

The pins or projections $c\ c'$ on the rod B may be adjustable therealong and fixable in position so as to cause them to act on the tipping lever E to reverse the valve sooner or later, and thus vary the quantity of gas admitted to and discharged from the spaces D D' at each pulsation of the bellows.

The rod B' of the gas-measurer extends through a stuffing-box $g$ in the outer end of the valve box or chamber C' and is connected to a suitable motor—such, for example, as that shown at the right of Fig. 1—the said motor being arranged to operate the bellows so as to compress the gas above the normal for supplying incandescent or intensified gas-light. This motor is a water-motor, which may also be used as a water-meter. The water is admitted by the passage $d^3$ to the valve box or chamber $C^2$, the passage $a$ being the exhaust or discharge port. The water admitted to the valve-box $C^2$ passes through the port or passage $b^3$ or $b^4$ to one or the other end of the cylinder A', according to the position of the valve $C^4$, and, acting on the piston B, drives the said piston along the cylinder, and so operates the bellows in the chamber A to compress the gas. The piston-rod $B^2$ projects from both sides of the piston through the ends of the cylinder, the outer end being connected to the rod B' of the bellows, while the inner end passes through a stuffing-box into the valve-box $C^2$ and is provided with pins or projections $c^3$ $c^4$ to act on the lever $E^2$ on the shaft $E^4$ for the purpose of reversing the valve in a manner similar to that hereinbefore described with reference to Fig. 1. I have shown the rod B broken between the meter and the motor to indicate that the motor may be situated at any desired distance from the meter. To permit of the compression of the gas in the meter, I provide the gas-inlet $a'$ and the outlet $d$ each with a non-return valve, as shown at $a^2$ $d^2$, Fig. 2, each valve consisting of a tubular cap $h$ or $h'$, having a leather top which seats onto the open end of the gas passage or pipe $a'$ or $d$, the tubular portion of the said cap having ports or perforations $i$ or $i'$ therein, so that the gas entering at $a'$ raises this cap or valve $h$ on the gas-tube $a'$, thereby raising the ports or perforations $i$ in the cap or valve above the top edge of the said tube and allowing the gas to pass therethrough into the valve-box. The gas in the chamber C is compressed by the motor operating the bellows, the pressure of the said gas acting on the top of the cap $h$ forcing the leather top thereof against the open end of the tube $a'$ and preventing the gas from reëntering the said tube. In like manner the compressed gas passing from the valve box or case C by the passage $d$ raises the cap or valve $h'$, allowing the gas to pass through the perforation $i'$ therein, the said gas being prevented from reëntering the passage $d$ by the gas forcing the leather top of the cap $h'$ onto the open end of the tube $d$.

By my invention I provide an apparatus which will operate with a single bellows and a single distributing-valve and dispense with the complicated arrangements hitherto employed in apparatus for the purpose aforesaid.

Although I have referred to the arrangement of inlets and outlets as shown in the drawings, it will be evident that the inlets may be arranged as outlets and the outlets as inlets, if desired.

I claim as my invention—

1. In apparatus for measuring gas, the combination of a chamber containing a bellows and a valve-box, having an inlet and an outlet for gas, and ports communicating respectively with the spaces, inside and outside of the bellows, with a valve governing the passage of the gas to and from the valve-box and the spaces inside and outside the bellows, a rod connected to the bellows extending into the valve-box, projections on the rod to act upon an oscillating lever operating on the valve, and a tipping-weight in connection with the lever, as and for the purpose described.

2. An apparatus for measuring and compressing gas, consisting of the combination of a chamber containing a bellows, a valve-box having an inlet and an outlet for gas, both provided with non-return valves and ports in the valve-box communicating with the spaces inside and outside the bellows, with a valve governing the passage of the gas through the said ports, and the spaces inside and outside the bellows, a rod connected to the bellows and extending through the valve-box to the exterior thereof, an oscillating lever acted on by the said rod to move the valve, and means for applying power to the rod connected to the bellows so as to compress the gas contained in the apparatus for use with incandescent-gas burners, all substantially as hereinbefore described.

In testimony whereof I affix my signature in the presence of two witnesses.

E. TATHAM.

Witnesses:
WILLIAM GERALD REYNOLDS,
JOHN EDWARD NEWTON.